Sept. 18, 1928.
H. M. PATCH
1,684,596
RESILIENT WHEEL
Filed June 8, 1927
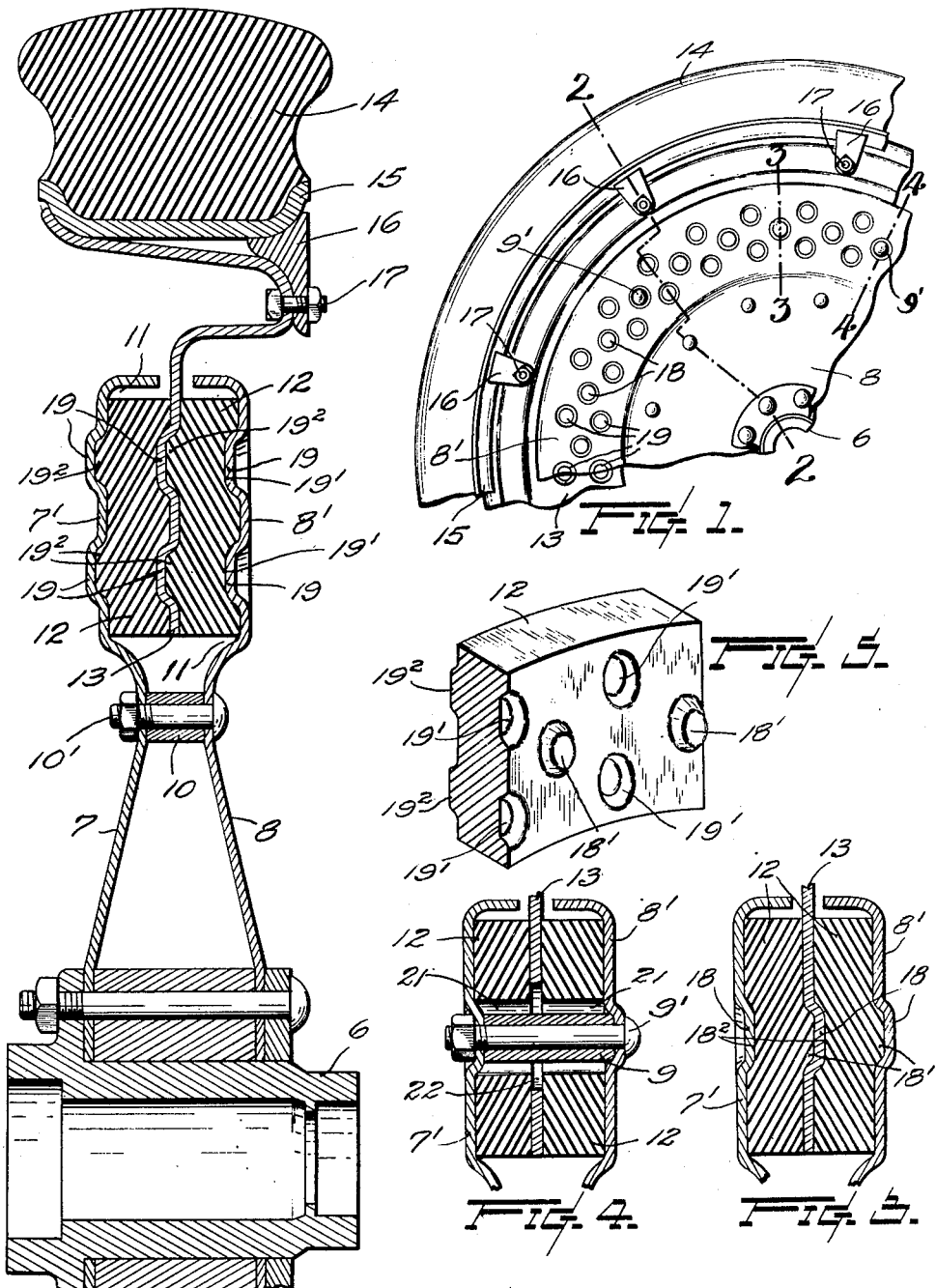
INVENTOR
Harry M. Patch
BY
ATTORNEY Patented Sept. 18, 1928.

1,684,596

UNITED STATES PATENT OFFICE.

HARRY M. PATCH, OF SEATTLE, WASHINGTON.

RESILIENT WHEEL.

Application filed June 8, 1927. Serial No. 197,287.

This invention relates to resilient vehicle wheels and has for its object to provide a wheel construction containing large bodies of elastic material arranged and associated with rigid wheel members in the manner to afford an easy riding, durable and efficient wheel.

With these and other ends in view, the invention consists of certain novel features of construction, and the novel arrangement and combination of parts hereinafter described and claimed.

In the accompanying drawing.—

Figure 1 is a fragmentary side elevation of a wheel embodying the present invention; and Figs. 2, 3, and 4 are detail sectional views taken substantially in lines 2—2, 3—3 and 4—4 of Fig. 1; and Fig. 5 is a perspective view of a portion of one of the resilient members shown in the preceding views.

In carrying out the present invention, I provide a rigid hub member, a rigid rim member, and elastic ring members which serve to resiliently couple said members together to afford relative movement between the latter.

Said hub member comprising the hub proper, which is designated by the reference numeral 6, and annular companion plates 7 and 8 which constitute the web of the hub member.

Said plates are held in spaced apart relation by means of tubular elements 9 and 10 and rivets, or bolts $9^1$ and $10^1$ as shown, extending through the respective spacing elements.

The outer peripheral portions of the web plates 7 and 8 are formed to provide interiorly of the hub member, annular recesses or grooves 11 to receive therein rings 12 of rubber or other elastic material. Each of said grooves 11 extends as a circle around the wheel axis and is concentric thereof. The wheel's rim member, above referred to consists of an annular plate element which is formed to provide an internal substantially plane portion 13 interposed between the rubber rings 12, and with its outer portion formed to provide a support for a tire 14.

As shown, said tire is of the demountable type having a channeled rim 15 which is detachably connected to the rim member of the wheel structure by means of wedge blocks 16 and securing bolts 17. The outer wall elements of the respective recesses 11 are provided by offsetting at angles to the plane of the wheel portions $7^1$ and $8^1$ of said web plates, such offset portions being in planes at right angles, or nearly so, to the axis of the wheel. The wall portions $7^1$ and $8^1$ of the web plates and the portion 13 of the rim member plate are each provided with similarly disposed hollow truncated conical protuberances 18 and 19 of which the protuberances 18, see Figs. 1 and 3, are disposed in a circular series circumferentially of the wheels and between two circumferentially arranged series of the protuberances 19 as shown in Figs. 1 and 2.

The protuberances 18, moreover, project in a direction opposite to that of the outer protuberances 19 hence the concave and convex sides of the respective protuberances of the several plates will be in opposed relation with each other.

Each of the rubber rings 12 is provided at one side with projections $18^1$ to engage in opposing cavities of hollow protuberances 18 of the respective plate elements of the wheel, such ring being also provided with cavities $19^1$ into which engage opposing protuberances 19 of the plates.

At the opposite side a rubber ring is, in like manner, provided with cavities $18^2$ and protuberances $19^2$, for engaging in and with opposing protuberances and recesses 19 and 18 respectively of the plates. By thus providing the plates with projections and recesses to interfit with recesses and projections of the rubber rings, the latter serve to resiliently key the plates of the hub and rim members together for limited relative movement in the plane of the wheel.

Such relative movement of the wheel members with respect to each other is accommodated by the rubber contents of the respective rings and act throughout the latter by reason of the distributive arrangement of their stud-and-socket connections, so to speak, of the rings engagement with the plate members.

Where the plates 7 and 8 are coupled by securing means, as 9 and $9^1$, extending through the region occupied by the rubber rings and the rim plate, the rings and plates are provided thereat with apertures, as 21 and 22, Fig. 4, of greater diameters than the respective spacing elements, thereby permitting unconstrained movement between rim and hub members.

The elastic rings having their axes coincide with the wheel axis and keyed by means of stud-and-socket engagement with both the rim and hub members of the wheel, provides a means of utilizing the resiliency of the rubber material in the rings to its maximum extent without straining the same or sacrificing its elastic properties.

What I claim, is,—

1. In a resilient wheel, the combination with a rigid hub member having spaced apart plate elements, and a rigid rim member having an annular plate element extending into the space between the plate elements of said hub member, of rubber rings located at opposite side of the rim element, each of said rings being arranged concentrically of the wheel axis to surround the latter, said rubber rings and the plate elements of both of said rigid members being provided with protuberances and recesses whereby interengaging connection is had between the rubber rings and both of said rigid members to resiliently couple the same together.

2. In a resilient wheel, the combination with a rigid hub member having spaced apart plate elements provided with annular grooves each of which being concentric with the wheel axis and in opposed relation with each other, and a rigid rim member having an annular plate element extending into the space between the plate elements of said hub member, of rubber rings located in the respective grooves of the hub member at opposite side of the rim element, each of the rubber rings being disposed to surround the wheel axis, said rubber rings and the plate elements of both of said members being provided with protuberances and recesses whereby interengaging connection is had between the rubber rings and both of said rigid members to resiliently couple the same together.

3. In a resilient wheel, the combination with a rigid hub member and a rigid rim member, said members having plate elements disposed in alternating relation one with another axially of the wheel, said plate elements of both members being provided with protuberances and recesses of substantially truncated conical forms disposed in spaced apart relation circumferentially of the respective plates, of a plurality of rubber rings each surrounding the wheel axis, said rings being interposed between the successive plate elements of said members, said rings being provided with recesses and protuberances to effect interengagement with said plate elements by means of the protuberances and recesses respectively of said plate elements whereby said rubber rings serve to resiliently couple the hub and rim members in the plane of the wheel.

4. In a resilient wheel, the combination with a hub member having plate elements, means positioned in proximity to the peripheries of said plate elements for rigidly retaining the same at a definite distance apart, and a rim member having a plate element extending into the space between the plate elements of the hub member, the plate element of the rim member being provided with apertures to accommodate said spacing means and being of greater diameter than such means to permit relative movement of the two members, of rubber rings interposed between the successive plate elements of both of said members, each of said rings surrounding the wheel axis and said plate elements being provided with protuberances engaging the respective rubber rings whereby the latter serve to resiliently couple the hub and rim members with each other.

5. In a resilient wheel, the combination with rigid hub and rim members having plate elements, the plate element of the rim member being interposed between the plate elements of the hub member, of rubber rings interposed between the successive plate elements of both of said members, each of said rubber rings surrounding the wheel axis and provided on opposite sides with series of spaced circumferentially apart protuberances and recesses, recesses and protuberances being provided upon the inner side of each of the plates of the hub member and upon opposite sides of the plate element of the rim member to interengage with the protuberances and recesses respectively of the rubber rings whereby said rings serve to resiliently couple the hub and rim members together.

Signed at Seattle, Washington, this 23rd day of May, 1927.

HARRY M. PATCH.